Figure 1:
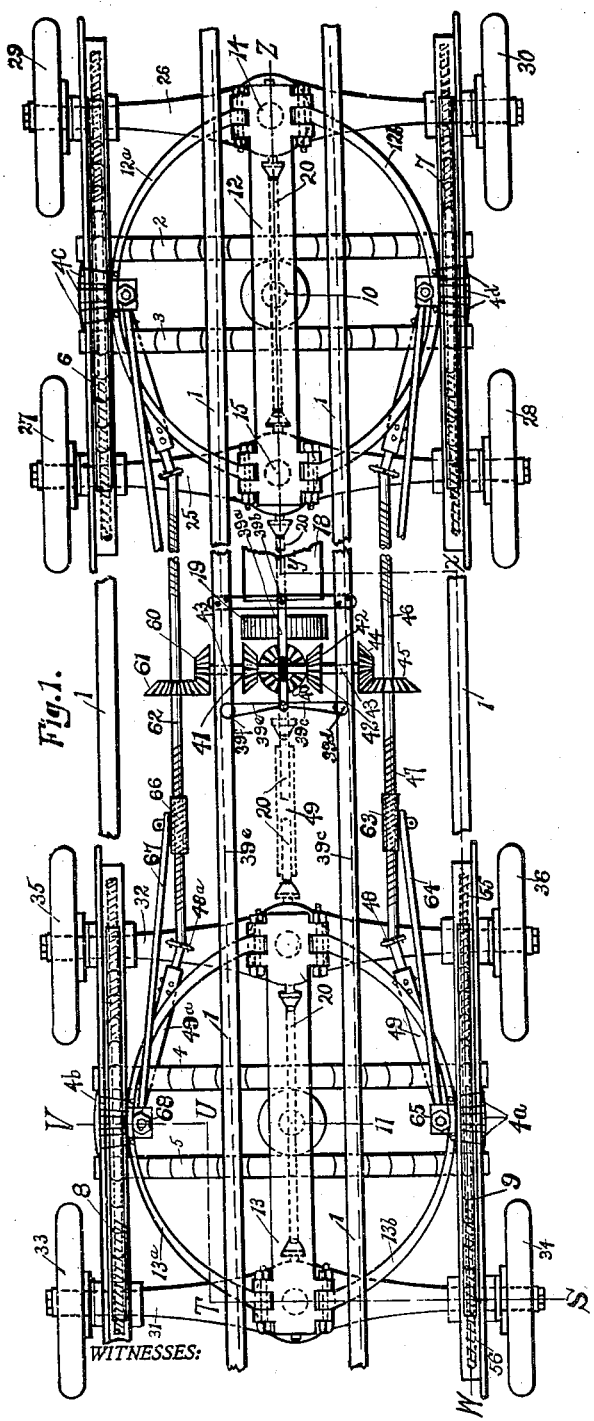

J. W. McLAREN.
MOTOR VEHICLE.
APPLICATION FILED JUNE 19, 1916.

1,275,580.

Patented Aug. 13, 1918.
4 SHEETS—SHEET 1.

WITNESSES:

INVENTOR.
James W. McLaren
BY
ATTORNEY.

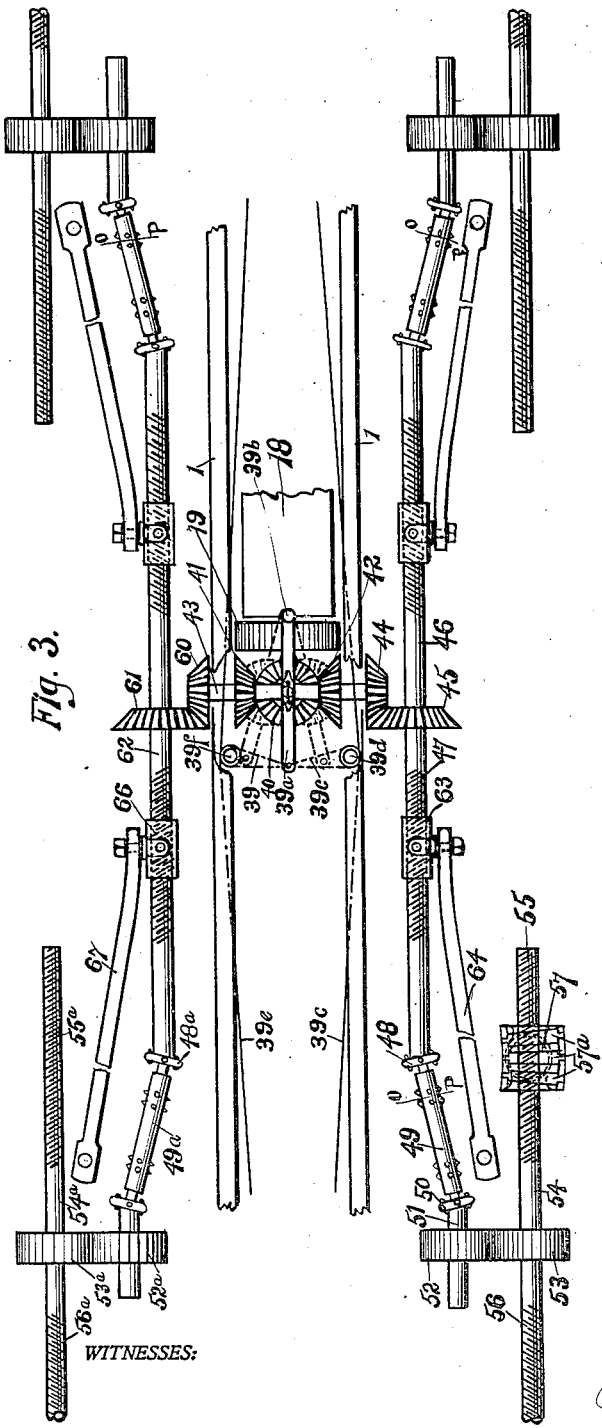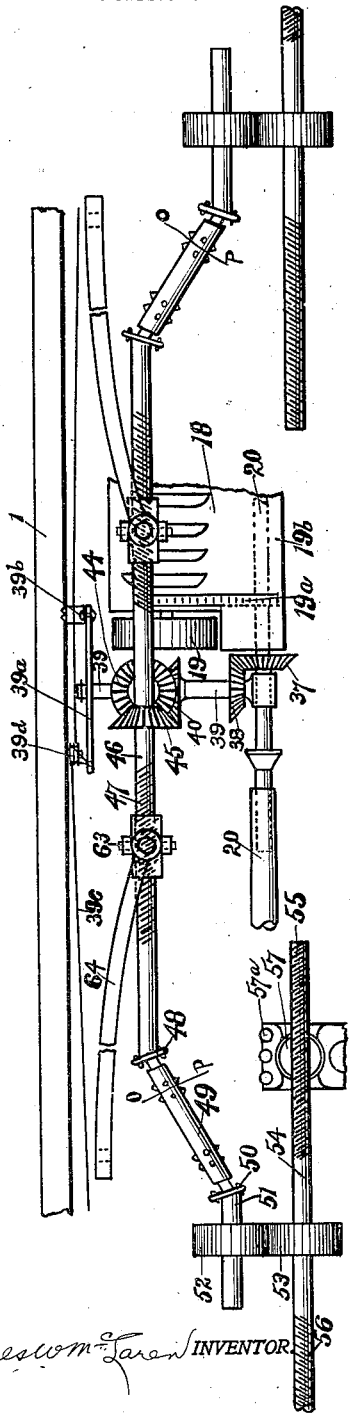

J. W. McLAREN.
MOTOR VEHICLE.
APPLICATION FILED JUNE 19, 1916.

1,275,580.

Patented Aug. 13, 1918.
4 SHEETS—SHEET 3.

INVENTOR.

BY

ATTORNEY.

J. W. McLAREN.
MOTOR VEHICLE.
APPLICATION FILED JUNE 19, 1916.

1,275,580.

Patented Aug. 13, 1918.
4 SHEETS—SHEET 4.

James W. McLaren INVENTOR.

BY

ATTORNEY.

UNITED STATES PATENT OFFICE.

JAMES W. McLAREN, OF COLUMBUS, OHIO.

MOTOR-VEHICLE.

1,275,580.   Specification of Letters Patent.   Patented Aug. 13, 1918.

Application filed June 19, 1916. Serial No. 104,604.

*To all whom it may concern:*

Be it known that I, JAMES W. MCLAREN, a citizen of the United States, residing at Columbus, in the county of Franklin and State of Ohio, have invented certain new and useful Improvements in Motor-Vehicles, of which the following is a specification.

My invention relates to improvements in motor vehicles and consists essentially in the provision of three or more axles with their supporting wheels so associated together as to be under one common controlling means which operates on each of said axles; the power is applied to each of the wheels and the wheels may be flexibly mounted on the axles as is usual under present construction for the front wheels, or rigidly mounted as in present wagon construction, and in either case the wheels constituting a pair are caused to move in parallel vertical planes. Preferably the axles are grouped two at one end of the vehicle and one at the other end where three are employed, two at each end or three at one end and one at the other where four are employed; and where five or six, which would probably be the maximum number desired, are employed, there would preferably be three at one end and the remainder at the other. The groups are connected for operation by a reach pivoted appropriately, and the members of each group are likewise connected for operation to form the group.

By this arrangement I distribute the load upon a larger number of wheels and consequently provide a greater number of points of contact with the roadway, whereby the load that can be carried over a street or roadway is greatly increased and the wear and crushing strain on the road is not increased. In most municipalities the load that may lawfully be carried is limited to a certain maximum for each wheel, and the breadth of the tread is also a matter for regulation, so that the maximum power of a motor vehicle can not as a rule be utilized. The same regulations are generally found in reference to country roads and the same advantages are possible with the use of my improved vehicle in those places also. Trucks for cross country transportation are now coming into very extensive use, and a need exists for such construction as is here disclosed. With the increase of the number of wheels there comes an increase of the tractive power of the vehicle due to the larger number of points of contact with the surface moved over, and consequently the wearing out or grinding away of the tires and roadway is greatly diminished.

Where the rigid mounting of the wheels is employed, the wear on the tires in turning or changing direction is also very greatly reduced; with large tires such as are used on freight trucks this is a matter of much importance. The diagrammatic views set out in the last four figures of the drawings herein illustrate this feature, especially in Figure 10.

Figure 2:
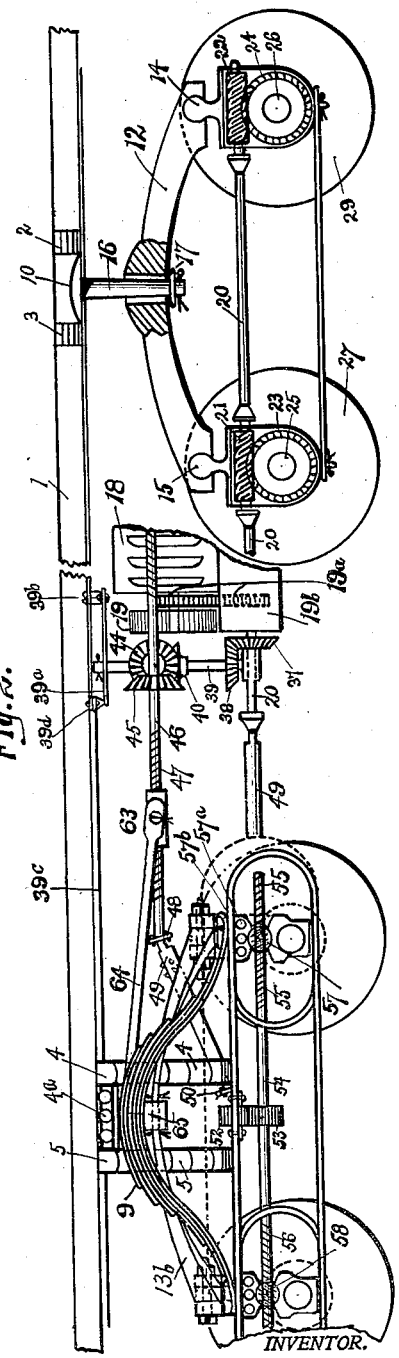
Figure 5:
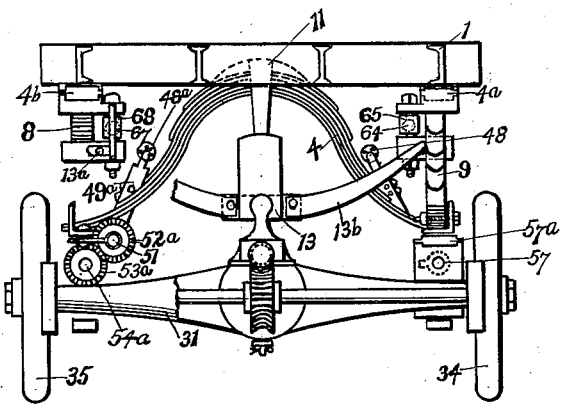
Figure 6:
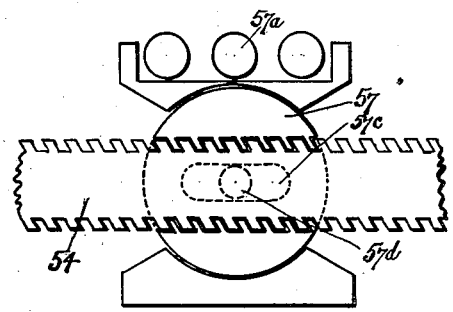
Figure 6A:
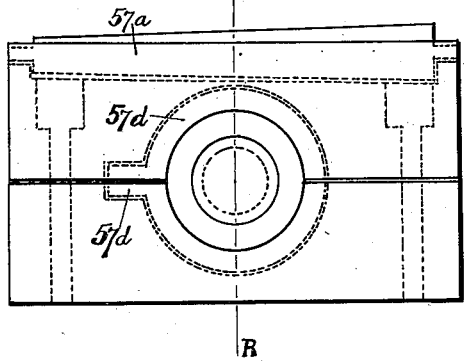
Figure 7:
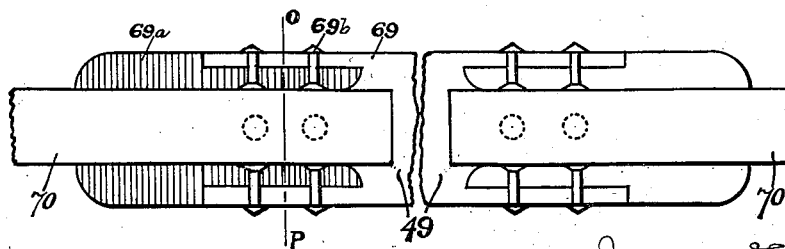
Figure 7A:
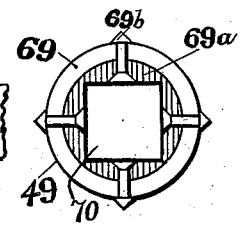

In the drawings which are hereto attached and hereby made a part of this specification, Fig. 1 is a top plan view of a vehicle having four axles supporting two trucks associated together, and the controlling and driving means employed to operate the vehicle. Fig. 2 is a horizontal vertical section through Fig. 1, along the line W X Y Z; Fig. 3 is a top partial view of the mechanism for controlling the wheel directions in manipulating the vehicle; Fig. 4 is a side view of the mechanism set out in Fig. 3; Fig. 5 is a vertical transverse section through Fig. 1 along the line S T U V; Fig. 6 is a view of the traveling ball with socket shown at 57 in Fig. 4, for giving the proper direction to the wheels in operating the vehicle and permitting a degree of vertical movement to accommodate the controlling means to the vertical movement of the wheels; Fig. 6$^a$ is a side view of Fig. 6; Fig. 7 is a sectional view on the line O P of Fig. 4 showing the extensible construction for delivering the controlling force to the wheel manipulating structure shown in Fig. 6; Fig. 7$^a$ is a cross section along line O—P of Fig. 7; Figs. 8, 9, 10, 11 show in outline motor trucks or trailers provided with three or more axles with the wheels rigidly mounted thereon.

Referring to the drawings, in which the same numeral indicates the same part throughout, 1 is the frame of the vehicle mounted on the transverse springs 2, 3, 4, 5 and on the longitudinal springs 6, 7, 8, 9 carried on the front and rear trucks. The roller bearings shown at 4$^a$ permit the truck to have a swinging movement beneath the frame to accommodate it to the requirements of operation. Similar bearings are provided at 4$^b$, 4$^c$, and 4$^d$. Said frame 1 is operatively connected with the trucks at 10 and 11 respectively, which for convenience may be here designated as the rear truck and the front truck respectively. On the rear truck at 16 is the king bolt passing through the truck frame 12 and having at its lower end the stop 17.

The connection shown permits freedom of movement vertically on the springs under the varying conditions experienced in operation. The frame 12 is curved and is mounted at 14 and 15 by the ball and socket on the truck; the curved members 12$^a$ and 12$^b$ are hinged at their ends on the frame member 12 and are especially used in effecting the swing of the truck as a whole in coöperation with the springs 6 and 7, and thereby the springs are held in place and also the roller bearings are more securely held in position.

On the front truck the frame member 13 corresponds with the frame member 12 and the curved members 13$^a$ and 13$^b$ correspond with the members 12$^a$ and 12$^b$ all above mentioned.

A motor 18 is appropriately mounted on the frame 1, being here shown conventionally; the fly wheel appears at 19. Power is transmitted by the chain and sprocket at 19$^a$ to the transmission casing 19$^b$, thence to the shaft 20, carrying the worm 21 adapted to mesh with the gear 23 to drive the wheels 27 and 28 carried on the axle 25; the worm 22 on the shaft 20 meshes with the gear 24 carried on the axle 25 and drives the wheels 29 and 30. A similar construction on the front truck drives the wheels 33 and 34 on the axle 31, and wheels 35 and 36 on the axle 32. It will be noted that each axle is adapted to swivel at its center as a unit.

Drive shaft 20 carries the gear 37 adapted to mesh with gear 38 on the vertical shaft 39 which carries thereon the gear 40; shaft 39 is mounted to oscillate in response to the movement of the lever 39$^a$ pivoted at 39$^b$, operated through the wire or cable 39$^c$ operating over the pulley 39$^d$, and the cable 39$^e$ operating over the pulley 39$^f$, whereby the gear 40 is brought into mesh at will with either gear 41 or 42. The cables are controlled by the operator who may be seated at either end of the vehicle, and the control may be exercised through a pedal or hand lever as desired in a well known way. Gear 42 is arranged on shaft 43 and likewise carried thereon is gear 44 adapted to mesh with gear 45 carried on shaft 46. Through the said arrangement of gears and shafts the shaft 46 is actuated from the motor of the vehicle to steer or control the vehicle through the additional mechanism now to be described. Shaft 46 is threaded at 47, and at 48 is joined to shaft 49 by a universal coupling; shaft 49 is joined at 50 by the universal coupling to the shaft 51 carrying the gear 52 adapted to mesh with gear 53 on shaft 54 which latter is oppositely threaded at its ends 55, 56, to engage respectively the balls 57, 58, mounted in the bracket shown enlarged in Figs. 6 and 6$^a$, mounted on the truck axle as appears in Figs. 2 and 3.

The frame member 57$^b$ supporting the springs 9 and the ends of springs 4 and 5 shown in Fig. 2, bears on the rollers 57$^a$ whereby the swing of the axles beneath the frame is accommodated. The ball 57 is internally threaded to receive the screw shaft 54 and is incased as appears in Fig. 6; the slot 57$^c$ receiving the pin 57$^d$ keeps the ball from turning on the screw and enables the screw to be accommodated to the lowered or elevated position of the wheels due to the unevenness of the surface traversed by the vehicle. The pin 57$^d$ prevents the ball from turning, as stated, which it might otherwise do under the stress of the turning impetus of the screw. By this construction the wheels 34 and 36 are pulled toward each other and the truck is given a new direction accordingly.

At the other end of shaft 43 gear 60 is in mesh with gear 61 on shaft 62, which corresponds with shaft 46 on the other side described above, and through this similar mechanism shown at 48$^a$, 49$^a$, 52$^a$, 53$^a$, the wheels 33 and 35 are pushed away from each other by the screw 54$^a$ on that side to accommodate said wheels to the new direction of the vehicle. The same form of construction at the other end of the vehicle accomplishes the same results, and in turning or altering the direction of movement of the vehicle the four wheels on a side are found to be in the arc of a circle, and the circle including the wheels on the opposite side is concentric with the first circle mentioned.

Carried on the shaft 46 is the traveling nut 63 to which is attached the bar 64 adapted to engage the member 65 carried on the spring 9 by hinge or otherwise to accommodate it to the vertical displacement of said spring under the conditions of operation, and when the shaft 46 is actuated the nut 63 moves along the shaft on account of the threaded connection therewith and through the bar 64 operated to pull or push the truck frame, and consequently the truck as a whole. When the wheels, through the mechanism above described, are turned to give a new direction to the truck as above mentioned, the truck as a whole is given the appropriate impetus in the same direction through the bar 64 and associated parts. Thus, when the wheels 34 and 36 are pulled together, the bar 64 is actuated to give the truck an impetus rearwardly on that side, assuming the movement of the vehicle to be toward the left in Fig. 1, while a similar mechanism on the opposite side gives the truck as a whole a forward impetus, and so the turning movement to change the direction of travel is greatly facilitated. The similar mechanism on the opposite side appears at 66, 67, and 68.

Figure 9:
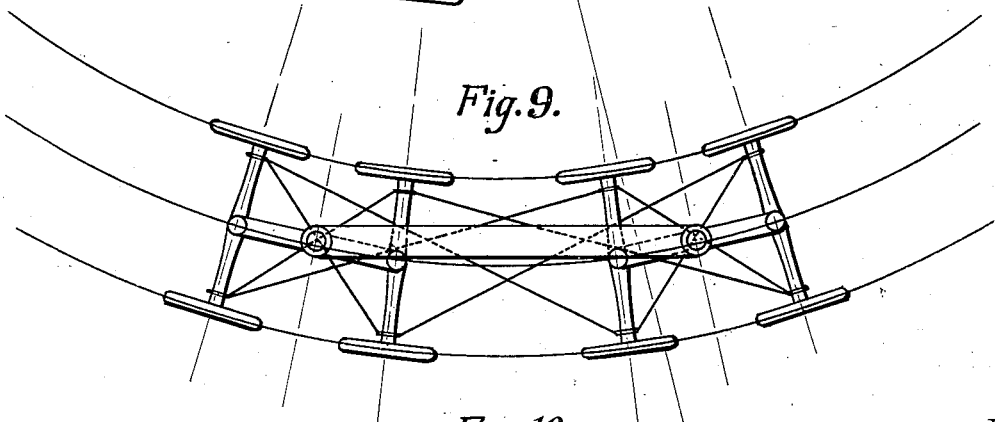

Reference to Fig. 9 shows that in the position of the parts illustrated therein the wheels on the inner side of the vehicle are in an arc of a circle concentric with the circle including the outer wheels; hence all the axles are portions of radii of the same circle, and the king bolts are also on the radii of the same circle. This harmonious relation of the parts which are described above I have discovered, and through this relation the operation of the vehicle of the kind herein described is rendered possible. Where three axles with their supporting wheels constitute a group as appears in Figs. 10 and 11, the middle pair of wheels is not included in the concentric circles mentioned, but my driving and controlling devices can be readily adapted thereto, and the advantages derived from the harmonious relation above described are preserved.

In Fig. 7 and 7ª is an enlarged detail of the shaft 49 on sectional line OP shown in Figs. 3 and 4; in Fig. 7 shaft 49 is shown composed of a casing member 69 surrounding the hollow square members 69ª, said members being secured together by the rivets 69ᵇ; the squared bar 70 is inserted into member 69ª and is adapted to have a telescoping movement therein under the conditions of operation above described. Thus shaft 49 is an extensible shaft and permits the accommodation of the actuating parts to the movement of the truck proper and of the wheels when they are swung to cause a change in the direction of movement of the vehicle.

Figure 8:
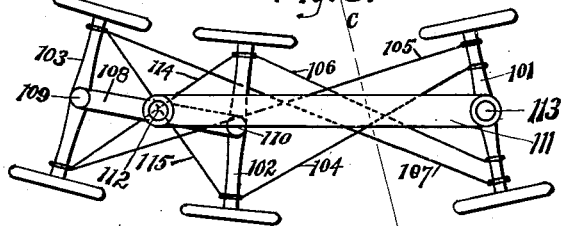

Figs. 8, 9, 10, 11, show the general principles controlling the construction of vehicles having three or more axles with their supporting wheels, providing the harmonious relation of parts through the connections shown, whereby the manipulation of the vehicle is readily accomplished. In Fig. 8 axle 101 is connected with axle 102 through the rods or cables 104 and 106, and with axle 103 through the rods or cables 105, 107, the attachment being made at such points on the respective axles as will provide for the proper related movement thereof. Axles 102 and 103 are associated as a group through rods or cables 114, 115, and the reach or frame member 108 pivotally connected thereto at 109 and 110. The connection of the group with axle 101 is accomplished through the reach or frame member 111, pivoted at 112 to the group and at 113 to the axle 101. The construction illustrated enables the vehicle, when used as a trailer, to adapt its direction to that of the motor vehicle described above used as a tractor. The trailer vehicle possesses all the advantages as to wear of tires, contact points with the surface traveled over, saving of roadways, and increased capacity of the vehicle, pointed out above for my improved motor vehicle. Clearly the tractor may be any kind of motor vehicle desired for use with my trailer vehicles, and all the advantages they furnish may be enjoyed regardless of whether they are employed with my improved motor vehicle or not.

Figure 10:
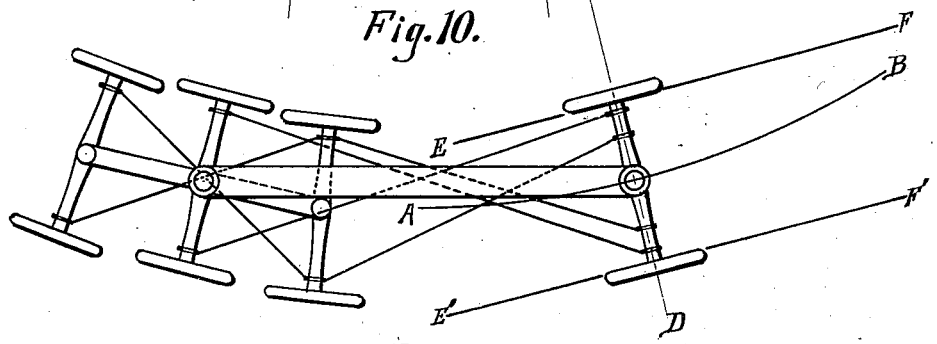
Figure 11:
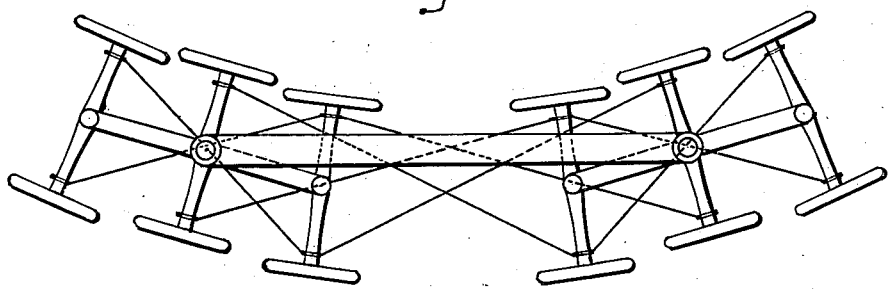

The operative connections in the vehicles illustrated in Figs. 9, 10, 11, are apparent, and will therefore need no further description; as the number of axles is increased the number of connecting rods or cables is increased, and the axles are necessarily related as shown to accomplish the movements desired.

My construction provides a greater wheel base than is possible with vehicles now in use, more points of contact with the surface operated over, a material saving of tires, and permits the movement of the vehicle to be directed forwardly with either end thereof and so avoids the necessity of turning around except on rare occasions. This feature adds a large degree of practicability to the construction, inasmuch as a long vehicle is not readily turned in the streets or roads in common use, and also renders the operation much faster; the vehicle, in other words, is moving ahead and normally, no matter which end for the occasion is at the front. Further, where my improved vehicle is self-moving, devices for applying power for moving and controlling the direction of movement are provided, which are new and are particularly adapted to vehicles having three or more axles.

What I claim as new is:—

1. In a motor vehicle having three or more axles, wheels rigidly mounted thereon and having a power plant thereon, provision for associating said axles in groups and provision for associating said groups, controlling means adapted to actuate said axles individually and by groups comprising a pair of longitudinal shafts actuated from the power plant, means connecting said shafts with the said axles individually, and means connecting the said shafts with said groups.

2. In a motor vehicle having three or more axles with wheels mounted thereon arranged in two groups, a steering shaft on each side of said vehicle, means connecting said shaft with each axle on that side, and means adapted to position the wheels in each of said groups on one side of said vehicle in an arc and the wheels on the opposite side in a concentric arc.

3. In a motor vehicle having three or more axles with wheels mounted thereon arranged in two groups, a steering shaft on each side of said vehicle, means connecting said shaft with each axle on that side, and means adapted positively to position the wheels in each of said groups on one side of said vehicle in an arc and the wheels on the opposite side in a concentric arc.

4. In a motor vehicle having three or more axles with wheels mounted thereon arranged in two groups, a steering shaft on each side of said vehicle, means connecting said shaft operatively with the axles on that side and adapted to be manipulated to shorten the interval between the wheels on one side to position said wheels in an arc and to lengthen the interval between the wheels on the opposite side to position said wheels in a concentric arc.

5. In a motor vehicle having three or more axles with wheels mounted thereon arranged in two groups, a frame for each group, a steering shaft on each side of said vehicle, means connecting said shaft with each of said axles, means connecting said shaft with the frame of the group of axles, and means for actuating each of said steering shafts to change the positions of the wheels and the frame on its respective side to alter the direction of travel of said vehicle.

6. In a motor vehicle having three or more axles with wheels mounted thereon arranged in two groups, a frame for each group, a steering shaft on each side of said vehicle, means connecting each of said shafts with the frame of the group, and means for actuating each of said shafts to swing said frame to alter the direction of travel of said vehicle.

7. In a motor vehicle having three or more axles with wheels mounted thereon arranged in two groups, a frame for each group, a steering shaft on each side of said vehicle, means connecting each of said shafts with its respective side of the frame, and means for actuating the shaft on one side to swing the frame forwardly and on the other side to retract said frame rearwardly whereby a new direction of travel is imparted to said vehicle.

8. In a vehicle having three or more axles with wheels rigidly mounted thereon, a shaft on each side of said vehicle, connections therewith adapted to act on each of said axles to change the direction of travel whereby each axle is caused to coincide with a radius of the same circle and the wheels on opposite sides of said vehicle lie in planes vertical to said radii.

9. In a vehicle having three or more axles with wheels rigidly mounted thereon, a shaft on each side of said vehicle, connections therewith adapted to actuate said axles to change the direction of travel of said vehicle, whereby said axles are brought into coincidence with radii of the same circle and said wheels lie in planes vertical to said radii, the wheels on one side of said vehicle lying in an arc concentric with the arc containing the wheels on the opposite side.

10. In a motor vehicle having three or more axles with wheels thereon arranged in two groups, a frame for each group, a steering shaft on each side of said vehicle, means connecting each of said shafts with said frames, and means for actuating one of said shafts to swing said frames in opposite directions, and means for actuating the other shaft to swing said frames toward each other to alter the direction of travel of said vehicle.

11. In a motor vehicle having three or more axles with wheels mounted thereon arranged in two groups, a frame for each group, a steering shaft on each side of said vehicle, means connecting said shaft with each of said axles whereby said axles in each group are drawn toward each other on one side of said vehicle and are urged away from each other on the opposite side, and means connecting said shaft with each of said frames whereby said frames on one side of said vehicle are swung toward each other and on the opposite side are swung away from each other.

12. A vehicle having three or more axles with wheels thereon associated in two groups, means operatively connecting the individual axles of each group with one or more of the individual axles of the other group, whereby said axles are moved harmoniously in the operation of the vehicle and coincide with radii of the same circle when the vehicle is undergoing a change of direction of travel.

13. A vehicle having three or more axles with wheels thereon associated in two groups, means operatively connecting the individual axles of each group with one or more of the individual axles of the other group, whereby said axles are moved harmoniously in the operation of the vehicle and coincide with radii of the same circle when the vehicle is undergoing a change of direction of travel, and whereby the wheels on opposite sides of said vehicles are caused to lie in concentric arcs during the progress of said change of direction.

In testimony whereof I affix my signature in the presence of two witnesses.

JAMES W. McLAREN.

Witnesses:
JOHN H. NAU,
GEO. W. RIGHTMIRE.